June 25, 1963   D. A. CUSANO ETAL   3,095,324
METHOD FOR MAKING ELECTRICALLY CONDUCTING FILMS AND ARTICLE
Filed April 14, 1960
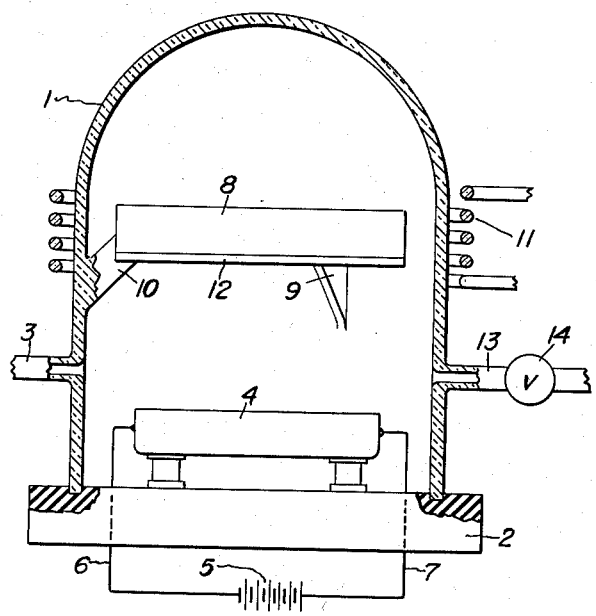
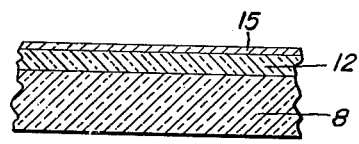
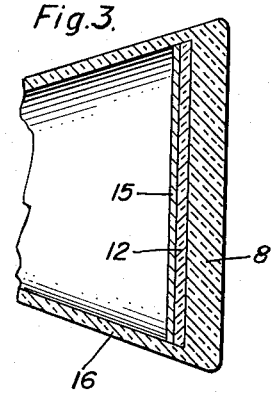
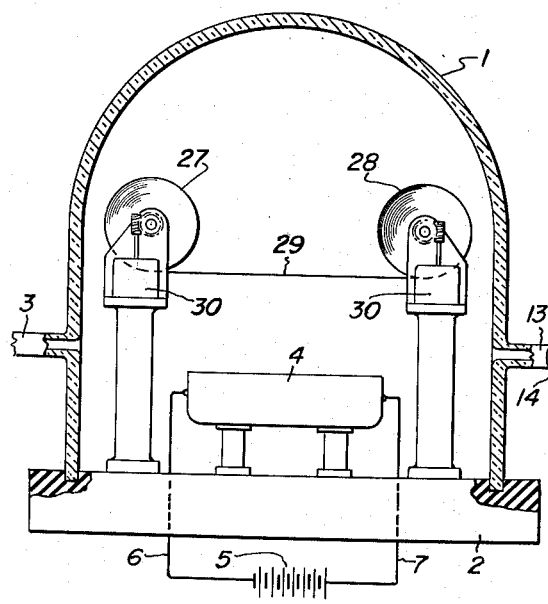
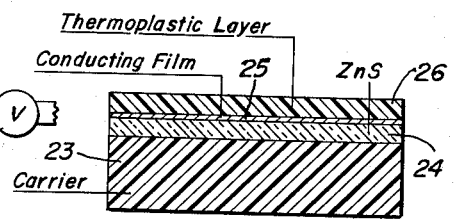
Inventor:
Dominic A. Cusano;
Richard L. Sormberger,
by John F. Ahern
Their Attorney.

United States Patent Office 3,095,324
Patented June 25, 1963

3,095,324
METHOD FOR MAKING ELECTRICALLY CONDUCTING FILMS AND ARTICLE
Dominic A. Cusano, Schenectady, and Richard L. Sormberger, Ballston Lake, N.Y., assignors to General Electric Company, a corporation of New York
Filed Apr. 14, 1960, Ser. No. 22,247
20 Claims. (Cl. 117—215)

The present invention relates to methods for forming extremely thin conducting films upon the surface of substrata which generally are of non-conducting materials, and to the products formed thereby.

There are many instances in which it is desirable, if not necessary, to form thin, oftentimes light-transmitting electrically conducting layers upon the surface of non-conducting bodies. Thus, for example, it is desirable that conducting layers be formed on the rear of a phosphor layer utilized in a cathode ray tube. Additionally, it is desirable that conducting layers be applicable to low softening point, plastic substances for the purpose of passing an electric current therethrough and, by the heat generated thereby, the plastic bodies be rendered free of ice accumulation as, for example, in the defrosting of Plexiglas (Rohm & Haas polymethyl methacrylate) windshields utilized in certain vehicles and structures.

A more recently occurring instance in which it is desirable to form a light-transmitting, electrically conducting layer upon a non-conducting layer arises in connection with the various modifications of "Thermoplastic Recording" such as disclosed and claimed in the copending application of W. E. Glenn, Serial Number 8,842, filed February 15, 1960, and assigned to the assignee of the present invention. In one embodiment of thermoplastic recording apparatus, a composite tape in the form of a reel thereof, similar to motion picture film which may, for example, have a Cronar base, has applied thereto a thin, light-transmitting, electrically conducting coating over which there is applied a layer of a thermoplastic material, that is, a material which is substantially solid at one temperature and substantially liquid at a higher temperature. Cronar is the commercial identification of Du Pont treated polyethylene terephthalate. For a more complete description thereof, reference is herein made to U.S. Patent 2,779,684—Alles. In addition to Cronar, Lexan polycarbonate resin and any of the materials disclosed in Boldebuck application Serial Number 8,587, filed February 15, 1960, may be used. This composite tape is passed through a "read in" apparatus in which the exposed surface of the thermoplastic material is subjected to an information-containing electron beam. This results in a charge storage pattern being established upon the tape in accord with the information contained in the electron beam. The composite tape may then be subjected to a heating cycle, as for example, to the influence of a radio frequency electric field which couples to the conducting layer and causes the temperature of the thermoplastic material to be raised to a point at which it becomes substantially liquid and is deformed by the electrostatic attraction between the charge pattern impressed upon one surface thereof and the conducting layer in contact with the opposite surface thereof which is generally maintained at the ground potential. The tape may then be cooled, thus "freezing" the deformation pattern upon the thermoplastic layer. Subsequent transmission of visible light through, or reflection from, the deformed thermoplastic tape, in a suitable optical and light working system, causes the occurrence of interference patterns which result in the presentation of an image in accord with the intelligence originally impressed thereupon by the electron beam. In such an application it is often desirable that the conducting layer exhibit high transparency to light. Additionally, it should be of uniform resistance, exhibit good adherence, lack of blemishes and a conductance sufficient to allow it to serve as a ground plane for the attraction of the tape-deforming electrostatic charges. It should, in tape applications, be of sufficient flexibility to resist deterioration as the tape is flexed and heated in use and reuse.

Accordingly, it is an object of the present invention to provide a method for forming electrically conductive, smooth, thin, uniform thickness films upon the surfaces of non-conducting bodies.

It is a further object of the invention to provide such films which have good qualities of adhering to the surface upon which they are formed and to other films deposited thereupon so as to resist physical and thermal stresses without loss of adhesion.

It is a further object of the invention to provide such films which are flexible and which do not deteriorate with constant mechanical and thermal stress nor cease to adhere to the materials in contact with one or more surfaces thereof.

Still another object of the present invention is to provide improved light-transmissive electrically conductive layers for photoluminescent and cathodoluminescent phosphor layers.

Still another object of the present invention is to provide improved electrically conductive coatings and methods of preparing the same for deposition upon non-conducting bodies suitable for defrosting, deicing, and radiant heating applications.

Yet another object of the present invention is to provide an improved light-transmissive, electrically conducting layer for use in the production of a composite information storage element for thermoplastic recording systems.

In accord with one embodiment of the present invention, a light-transmissive, electrically non-conducting layer of a zinc sulfide-type compound having a cation falling within group IIb of the periodic table and an anion falling within group VIb of the periodic table is formed upon a suitable substrate from a vapor phase. The substrate and the zinc sulfide-type compound are then immersed in a bath containing metallic ions which are capable of replacing the cation of the zinc sulfide compound to form a surface-adjacent film therein which has a low electrical resistance. The bath is continued for a sufficient length of time to attain the desired degree of conductivity. After bathing, as described, the substrate and the material thereupon are removed from solution, washed and dried. For improved characteristics the substrate may be heat treated to "cure" the conducting film.

In accord with one feature of the invention, the zinc sulfide-type layer may be a suitably activated phosphor produced from the vapor phase and the composite structure may be utilized as a faceplate of a cathode ray tube. In another embodiment of the invention, the zinc sulfide-type compound may be deposited by vacuum evaporation upon a plastic or glass windshield for automobile, boat or similar vehicles and structures and the conducting coating formed as described above may be utilized to prevent the formation of ice, frost, and liquid condensation thereupon.

In still another embodiment of the invention the zinc sulfide-type compound may be formed upon a rigid or flexible substrate and, after a conducting film has been formed upon the surface thereof, a suitable thermoplastic material may be deposited thereupon for use in storage and projection of information in accord with thermoplastic recording techniques.

The novel features believed characteristic of the present invention are set forth in the appended claims. The invention itself, together with further objects and advantages thereof, may best be understood by reference to the following description taken in connection with the appended drawing in which:

FIG. 1 represents a suitable apparatus for the formation of a zinc sulfide-type non-conducting layer in accord with one step of the present invention, FIG. 2 is a greatly enlarged vertical cross-sectional view of a composite film after treatment in accord with another step of the present invention, FIG. 3 illustrates a cathode ray tube screen constructed in accord with the present invention, FIG. 4 illustrates, in cross section, a composite thermoplastic recording tape utilizing a light transmitting electrically conducting film formed in accord with the present invention, and FIG. 5 illustrates a modified apparatus suitable for the practice of the invention with long strips of tape.

Zinc sulfide and similar compounds are of great utility in the production of light. Thus, for example, activated zinc sulfide and similar compounds which are composed of a metallic cation from group IIb of the periodic table other than mercury and a non-metallic anion from group VIb of the periodic table other than polonium are well known photoluminescent and cathodoluminescent materails. These substances are referred to herein as a class of "zinc sulfide-type compounds." Zinc sulfide-type compounds include compounds having a cation selected from the group consisting of zinc, cadmium, and mixtures thereof and an anion selected from the group consisting of sulphur, selenium, tellurium and mixtures thereof. The use of the phrase "and mixtures thereof" herein indicates the inclusion in this group, as operable species, of complex compounds such as zinc-cadmium sulfide, zinc-cadmium selenide, zinc sulfo-selenide, cadmium sulfo-selenide, zinc-cadmium sulfo-selenide and the like. The community of properties of these complex and simple compounds has long been recognized in the phosphor arts.

It is now well known to the art that these substances may be formed in thin, transparent films upon suitable substrata, such as glass, suitable organic plastics and the like. These films may, for example, be formed by the reaction of a vapor of a zinc or cadmium containing compound with or without suitable luminescence activators with a sulfide, selenide or telluride gas in the vicinity of a heated substrate, as is described, for example, in Cusano et al. Patent 2,732,313. Alternatively, these films may be formed upon vitreous or non-vitreous substrata by vacuum evaporation as is, for example, set forth in U.S. Patents 2,732,312—Young et al. and 2,867,541—Coghill et al.

One apparatus suitable for the formation of thin films of zinc sulfide type compounds by evaporation is illustrated in FIG. 1 of the drawing. In FIG. 1, a bell jar 1 rests in vacuum-tight relationship with a base member 2. Means are provided to evacuate the bell jar through a vacuum line 3 connected to a vacuum pump (not shown). Wtihin bell jar 1, a suitable evaporation crucible 4 is electrically in series with a source of voltage represented generally by battery 5 connected thereto by conductors 6 and 7. Immediately over evaporation crucible 4 a suitable substrate which may, for example, be a glass plate 8 is suspended by supporting members 9 and 10. Means external of bell jar 1, represented generally by electric resistance coil 11, are provided to raise the temperature of substrate 8 to any desired value. If the film is to be formed by evaporation, the zinc sulfide type compound is placed in evaporation crucible 4 and, after evacuation of the bell jar, a suitable electric current is passed therethorugh to raise the temperature thereof to a temperature at which the compound vaporizes, causing a cloud of vapor to fill that portion of the chamber on the lower side of substrate 8 and depositing a layer 12 of a zinc sulfide-type compound on the under side thereof. Alternatively, if the vapor reaction technique of the aforementioned Cusano et al. patent is to be utilized, substrate 8 is heated by coil 11 and a suitable compound, such as zinc chlorine, may be evaporated while a suitable gas, such as hydrogen sulfide, is admitted to bell jar 1 through inlet tube 13. This tube is closed with a stopcock 14 when the process utilized is evaporation rather than vapor reaction.

Previosuly, conducting surfaces had been formed upon such layers by the application of tin oxide, titanium dioxide or a thin evaporated film of a metal such as aluminum or silver. While in certain instances, each of these conducting films has proven to be quite satisfactory, in certain other applications, particularly those in which resistance to heat and mechanical stress is desirable, other improved films are needed. The process of the present invention provides such improved films. These films are light-transmissive, electrically-conductive, of uniform thickness and resistance, free of blemishes and are formed upon layers of zinc sulfide-type compounds, adhering thereto with great strength under mechanical and thermal stress.

In accord with the present invention, a layer of a zinc sulfide type compound of suitable thickness, depending upon the ultimate application to which the resultant product is to be applied, is first formed upon a suitable substrate which also depends upon the application. Thus, for example, the ultimate product to be produced is the faceplate of a cathode ray tube, a glass substrate may be utilized and a layer of an activated zinc sulfide-type compound is formed thereupon with the thickness of, for example, 0.5 to 50 microns. If, on the other hand, the device is to be utilized as an electrically heated windshield or a radiant heating panel, the substrate may be coated with an unactivated zinc sulfide-type compound of, for example, from 0.1 to 1 micron in thickness. If the product being produced is a composite tape for use in a thermoplastic recording system, a zinc sulfide-type compound may be formed by vacuum evaporation upon an unheated Cronar substrate, the zinc sulfide compound having a thickness of, for example, approximately 2500 A.U.

If the substrate which the zinc sulfide-type compound is deposited upon is glass, and particularly if it is Pyrex, Vycor or a similar high temperature glass which can be heated to temperatures of 500° to 700° C. without being deleteriously affected thereby, the zinc sulfide-type compound layer may be formed by the process of chemical reaction at the heated substrate surface such as is disclosed in the aforementioned Cusano et al. patent. If, on the other hand, the substrate upon which the zinc sulfide-type compound is to be formed is a non-vitreous organic plastic material or an extremely low melting-point glass, such as is in the case in the formation of certain radiant heating devices, defrostable windshields and composite thermoplastic tapes, the zinc sulfide-type compound is formed by evaporation of the compound itself in an evacuated enclosure while the substrate is maintained at a temperature which may, for example, be room temperature, but which is, in no case, higher than the temperature at which the material is deleteriously affected so as to soften, deform, or undergo chemical change. Such a temperature is, for example, less than 150° C. for a Cronar substrate.

Once the zinc sulfide-type compound has been formed upon the substrate in the desired thickness, the coated substrate is immersed in a suitable solution for a time sufficient to produce the desired degree of conductivity. Compounds suitable for the preparation of the solution utilized in the practice of the present invention are many and include copper acetate, copper sulphate, copper chloride, copper bromide, copper nitrate, copper iodide, copper carbonate, copper acetyl-acetonate and the corresponding gold and silver compounds thereof. With the exception of the organic compound listed, the salts utilized initially are generally divalent, as the monovalent salts are often not stable or readily available. If the monovalent salt is available and stable, it is, of course, suitable. Their solutes may be present together with other compounds, reducing agents such as hydrazine sulphate and sodium hypophosphite, the function of which is to cause the metallic ion to exist in a monovalent state which is preferable to the divalent state in solution. The solvent utilized in the formation of the treating solution is preferably water, but may as well be an organic polar liquid such as ethyl alcohol, methyl alcohol, ethylene glycol, or any similar polar solvent which does not inhibit transfer of the metallic ions between the solution and the zinc sulfide-type compound surface or react chemically with the solute or the zinc sulfide-type compound layer to an extent to prevent the formation of a conducting film or destroy the zinc sulfide-type layer. Extremely acidic solutions should, therefore, not be used. The solution used should have a pH of from 4 to 8.

The monovalent metallic ions used are not as soluble as desirable in other than strongly acidic polar solutions, such as water. It is, therefore, also desirable to add to the solution a sufficient quantity of a complexing agent such as pyridine, ammonia, aniline, quinoline, thiourea or other well known complexing agents which complex the monovalent ion, to facilitate the formation of soluble complex compounds of the monovalent metallic ion. The strength of the solution is not critical and may vary from as low as 0.01 normal for one containing primarily monovalent ions to a saturated solution containing primarily bivalent ions.

It is believed that the conductive coatings formed upon the surfaces of layers of zinc sulfide-type compounds in accord with the present invention are due to the replacement of zinc or cadmium in the crystal lattice of the zinc sulfide-type compound by the metallic ion of the solute, since all of the metallic ions with which the invention are practiced are below zinc and cadmium in the electromotive series of the elements. It is also believed that the most effective action results from the presence of these metallic ions in the monovalent state in solution. For example, solutions containing primarily $Cu^+$ ions act much more rapidly than those containing primarily $Cu^{++}$ ions. Accordingly, in the preferred embodiment of the practice of the invention, the treating solution in which the zinc sulfide-type compound is bathed is chosen to contain primarily monovalent ions. It is further preferred, because of the low resistivities obtainable and the availability thereof, that the ion be the cuprous ion. The former may be accomplished by using a solute which contains primarily monovalent ions or by using a solute which contains few monovalent ions together with appropriate reducing agents and complexers, as noted above.

It is further believed that chemical diffusion and displacement results in the formation of a film or skin of a conducting compound as, for example, a copper, silver or gold compound of sulphur, selenium, or tellurium upon the surface of the zinc sulfide-type compound film. Chemical analyses of conducting films formed in accord with this invention have indicated, in two instances, when a copper salt was the solute, quantitative values for the composition thereof of $Cu_2S$ and $Cu_{1.8}S$, indicating the presence of monovalent copper as the sole metallic ion or in combination with some bivalent copper ions.

The solution in which the reaction takes place may be maintained at room temperature i.e. approximately 25° C. or may be elevated as, for example, to a temperature of approximately 100° C. to 150° C. without adversely affecting the properties of the films involved. The immersion in the solution may be continued for a period varying from a few seconds to hours, depending upon the degree of conductivity desired in the skin so formed and the thickness thereof, as well as the materials utilized. Thus, for example, cadmium sulfide appears to be treated by copper ions more rapidly than zinc sulfide. After immersing in the solution for the desired time (which may of course vary depending upon the solvent, the solute and the temperature of the solution utilized), the substrate having thereupon the zinc sulfide-type compound layer with a thin conducting film is removed, washed and dried. While the film, as is, displays sufficient conductivity for the uses described hereinbefore, it is preferable that the film be "cured" by heating the composite structure to a moderate temperature of, for example, 100° C. to 200° C. for a period of several hours in order to improve the conducting characteristics and transparency thereof. Such heating may be accomplished by baking the structure in air or by connecting a moderate value of alternating current voltage between opposite terminals of the conductive layer and allowing the normal resistance heating due to the passage of current therethrough to take place. Such electrical curing may be done in a matter of minutes. The resultant structure is shown in greatly enlarged cross section in FIG. 2 wherein substrate 8 has a zinc sulfide-type compound 12 deposited thereon, the surface film region 15 of which is rendered electrically conducting.

After the foregoing steps have been performed, a finished product which has utility in many cases results. Thus, for example, if a glass substrate has been utilized and an activated zinc sulfide phosphor has been deposited thereupon the resultant structure may be incorporated as the faceplate of a cathode ray tube, such as that shown in FIG. 3 of the drawing. In FIG. 3, the envelope 16 of a cathode ray tube is closed by faceplate 8 having thereon a phosphor layer 12 and a conducting layer 15.

In another application, the substrate may be an organic plastic or glass windshield, in which case the structure is suited for electrical connection to prevent the formation of ice, frost, or condensation thereupon. Likewise, if it is desired that the conducting film be utilized in electrical radiant heating and the proper substrate has been utilized, no further processing is necessary.

If, on the other hand, a roll of Cronar or similar tape or a glass plate has been utilized and it is desired to produce a composite tape or slide useful in thermoplastic recording systems, as set forth in the aforementioned Glenn application, further processing may be necessary. This entails applying a suitable thermoplastic material such as those set forth in the aforementioned Glenn application or in the copending application of E. M. Boldebuck, Serial Number 8,587, filed February 15, 1960, and assigned to the present assignee, over the conducting film, formed as described hereinbefore. As disclosed in the Boldebuck application, thermoplastic layers may be made of compatible mixtures of (1) an organopolysiloxane and (2) an aryl polymer selected from the class consisting of polyarylene ethers, a polystyrene and mixtures of a polyarylene ether and a polystyrene. This may be accomplished in a number of ways, such as by passing the tape over a "doctor" roller which is in contact with another roller in a solution of a suitable thermoplastic material. Additionally, the thermoplastic layer may be applied by spraying or painting. If, on the other hand, composite slides to be used in thermoplastic recording are to be formed, then a suitable substrate, preferably glass, having thereupon a layer of a zinc sulfide-type compound which is transparent and approximately 2500 A.U., for example, in thickness having a conducting film thereupon of, for example, approximately 50 A.U. thick, formed as described hereinbefore, may be held horizontally and dipped, with the conducting face downward, into a solution of a suitable thermoplastic material, removed and dried. Such a slide may, of course, be coated by spraying, painting, etc. These tapes and slides are then suitable for utilization in accord with the thermoplastic recording and projection systems described in the aforementioned Glenn application.

In FIG. 4 of the drawing there is shown, in vertical cross section, a greatly enlarged view of a thermoplastic recording element utilizing a conducting layer formed in accord with the present invention. In FIG. 5, a strip of Cronar tape 23 has deposited thereover, by vacuum evaporation, a thin layer 24 of a zinc sulfide-type compound, the exterior surface adjacent region 25 of which has been rendered electrically conductive in accord with the present invention. The resistance of region 25 may vary from the order of $10^2$ to $10^6$ ohms per square as compared with the resistances of Cronar and zinc sulfide which are of the order of $10^{12}$ ohms per square. After treating and curing of layer 25, a layer of thermoplastic material 26 is sprayed, painted, applied by rollers or other suitable means thereover to complete the assembly. Alternatively, a glass plate may be substituted for tape 3 to produce a slide.

In FIG. 5 there is illustrated a modification of the apparatus of FIG. 1 specifically adapted to apply layers of a zinc sulfide-type compound to an elongated tape. In FIG. 5, like numerals identify like parts to the apparatus of FIG. 1. Additionally, the apparatus of FIG. 6 includes first and second reels 27 and 28, respectively, for continuously passing an elongated tape 29 over an evaporation crucible. Reel 28 is turned by a suitable drive, represented generally by motor 30.

While the invention has been set forth hereinbefore in accord with the general principles and parameters thereof, the following specific examples of the formation of conducting coatings and composite layers in accord with the invention are set forth. These examples are shown by way of example only and are not to be construed in a limiting sense.

*Example 1*

A 2" square Pyrex glass plate is suspended in an evacuable bell jar over an evaporation boat as in FIG. 1. The bell jar is evacuated to a pressure less than 100 microns at which time the glass plate is heated by an external heater to a temperature of approximately 600° C. and hydrogen sulfide gas at a pressure of approximately 600 microns is metered in through valve 14. Simultaneously approximately 10 amperes current at 25 volts is passed through evaporation boat 4 which contains 50 grams of zinc chloride and 5 grams of U.S.P. grade manganese chloride. The zinc chloride and the manganese chloride evaporate and react with the hydrogen sulfide gas in the vicinity of the titanium dioxide coated surface of the glass plate causing the deposition thereupon of a layer of manganese and chlorine activated zinc sulfide. With the quantities utilized and an operation time of approximately 30 minutes, a layer of approximately 10 microns thickness is formed. The electric currents are discontinued and the apparatus cooled. The glass plate is removed from the bell jar and is immersed in a 0.1 normal water solution of technical grade copper acetate which is maintained at a temperature of 80° C. for 5 seconds. After immersion, the plate is removed, washed in distilled water, and air dried. The resistivity of the surface of the zinc sulfide layer is, upon measurement, found to be approximately 30 megohm per square.

*Example 2*

The process as set forth in Example 1 is reproduced and the washing in copper acetate is continued for 15 seconds. After washing and drying the resistivity is found to be 5 megohms per square.

*Example 3*

The process is carried out in as in Example 1 but the bathing is continued for 30 seconds. After washing and drying the resistivity of the surface film of the zinc sulfide is found to be 1.6 megohms per square.

*Example 4*

The process is carried out as in Example 1 except that the washing in copper acetate is continued for 1 minute. After washing and drying the resistivity of the film is found to be 0.3 megohm per square.

*Example 5*

The process is carried out as in Example 1 except that the washing in copper acetate is carried out for 5 minutes. After washing in distilled water and air drying the resistivity of the film is found to be 0.076 megohm per square.

*Example 6*

The film formed by Example 1 are further subjected to a 20 minute bakeout in air at 80° C. After bakeout, the resistivity of the film is found to be 12 megohms per square.

*Example 7*

The films of Example 2 are baked for 20 minutes in air at 80° C. After bakeout the resistivity of the films is found to be 1.9 megohms per square.

*Example 8*

The films formed in Example 3 are baked out in air at 80° C. for 20 min. After bakeout the resistivity of the film is found to be 0.8 megohm per square.

*Example 9*

The product formed in Example 4 is baked for 20 minutes in air at a temperature of 80° C. after which the resistivity thereof is measured as 0.195 megohm per square.

*Example 10*

The product of Example 5 is baked in air for 20 minutes at a temperature of 80° C. after which the resistivity thereof is measured as 0.055 megohm per square.

*Example 11*

Valve 14 of the apparatus of FIG. 1 is closed and a Pyrex glass plate 2" square is placed in suspension over evaporation boat 4. 5 grams of luminescent grade zinc sulfide are placed in the evaporation boat. The bell jar was closed and evacuated to a pressure of less than 10 microns of mercury. A current of 10 amperes at 25 volts was passed through evaporation boat 4. After a period of 3 minutes current through the evaporation boat was discontinued and the bell jar demounted and the plate removed. A layer of zinc sulfide approximately 2500 A.U. thick is formed upon the glass plate. The plate was washed in a 1 normal water solution of technical grade copper sulphate maintained at 25° C. for ½ hour. A conducting film approximately 250 A.U. thick was formed on the exposed surface of the evaporated zinc sulfide layer. The resistivity of this film upon measurement was found to be 500 ohms per square.

*Example 12*

The process as set forth in Example 11 is carried out resulting in the formation of a 2500 A.U. thick layer of zinc sulfide being evaporated upon the glass plate. The plate is then immersed in a 1 normal water solution of copper technical grade sulphate at a temperature of 100° C. for 2 minutes. A film of a sulfide of copper approximately 250 A.U. thickness is formed upon the zinc sulfide layer. Upon measurement the resistance of this layer is found to be approximately 500 ohms per square.

*Example 13*

The apparatus of FIG. 6 is utilized and a 50' length of approximately 0.004" thick 16 millimeter Cronar tape is placed upon one reel and threaded into the other. Approximately 100 grams of zinc sulfide in the form of a pressed pellet are placed within the evaporation boat and the bell jar is evacuated to a pressure of less than 10 microns of mercury. A voltage of 25 volts is applied across the evaporation boat, causing current to flow therein causing the zinc sulfide pellet to begin to evaporate. Simultaneously, the mechanism to cause rotation of the second reel is energized and the Cronar film progressively passes over the evaporation boat at a rate of approximately 10' per minute, causing the deposition thereupon of a film of zinc sulfide approximately 2500 A.U. in thickness. The reel is removed from the bell jar after the evaporation process is completed. Two solutions are then prepared. One solution contains 10 grams of technical grade copper sulphate dissolved in 300 grams of water. The second solution contains 6 grams of hydrazine sulphate, 15 grams of sodium hypophosphite, 150 grams of pyridine, and 300 grams of water. Solution 2 is then added to solution 1 with gentle stirring and heated to a temperature of 85° C. The tape prepared by the aforementioned evaporation process is then passed through the solution at a rate so that any particular portion of the tape is immersed therein for approximately 1 minute. After treatment, the tape is washed in distilled water and air dried. By treatment in the solution, a film of a primarily monovalent sulfide of copper having a thickness of approximately 50 A.U. is formed upon the surface of the zinc sulfide film. Upon testing, this surface film is found to have a resistivity of approximately 300 ohms per square. This tape is then suitable for the formation thereupon of a layer of thermoplastic material for use in thermoplastic recording.

*Example 14*

The evaporation step described in Example 13 is repeated using a 100 gram pellet of cadmium sulfide rather than zinc sulfide. The same solution utilized in Example 13 is prepared and the film is passed therethrough while the solution is maintained at a temperature of approximately 85° C., the film being passed through at a rate so as to cause any portion thereof to remain immersed in the solution for only approximately 5 seconds. After washing with distilled water and air drying, a film of approximately 150 A.U. thickness of a primarily monovalent sulfide of copper is found to be formed upon the layer of cadmium sulfide. Upon testing, the resistivity of this film is found to be approximately 100 ohms per square. This film is then suitable for the deposition thereupon of a thermoplastic layer to cause a tape suitable for thermoplastic recording as described hereinbefore.

*Example 15*

The apparatus of FIG. 1 is utilized. A 2" square Pyrex glass plate is suspended within the bell jar and 25 grams of zinc chloride is placed within the evaporation boat. The bell jar is sealed and the pressure therein lowered to less than 10 microns of mercury. At that time, valve 14 is opened and hydrogen selenide gas at a pressure of 10 microns of mercury is admitted into the chamber while, at the same time, electric current is supplied to the evaporation boat to cause evaporation of the zinc chloride. The glass plate is simultaneously heated by the external heating coil to a temperature of approximately 550° C. The zinc chloride vapors react with the hydrogen selenide gas to form a chemically deposited layer approximately 10 microns thick of zinc selenide upon the under surface of the heated Pyrex plate. A treating solution is prepared, as in Example 13, and the Pyrex glass plate having thereupon the zinc selenide layer is immersed therein for 1 minute. After immersion, the plate is washed in distilled water and air dried. Tests performed thereupon indicate the formation of a predominantly layer of copper selenide having a thickness of approximately 50 A.U. and a resistivity of 50 ohms per square.

*Example 16*

The process as performed in Example 15 is repeated utilizing hydrogen telluride gas rather than hydrogen selenide. The resulting product is a zinc telluride layer upon the glass plate having a conducting film thereupon with an approximate thickness of 50 A.U. and an electrical resistivity of 20 ohms per square.

*Example 17*

The process of Example 13 is performed substituting silver sulphate for the copper sulphate in solution 1. The processed film is submerged for 5 minutes in the solution which is maintained at a temperature of 70° C. A film of a sulfide of silver is formed upon the zinc sulfide layer. The electrical resistivity of this film is approximately 100,000 ohms per square.

*Example 18*

A 50' length of Cronar tape 16 millimeters in width and approximately 0.004" thick is first cleaned in tetrahydrofuran. A layer of zinc sulfide is continuously evaporated upon the surface thereof as set forth in Example 13. This evaporation is conducted with the tape at room temperature and results in the formation of a 0.2 micron thick layer of zinc sulfide upon one surface of the tape. The speed of the reels is adjusted to cause the entire 50' strip to be coated in 1 minute. The film is bathed in a 2 normal solution of copper acetate in water which is maintained at a temperature 100° C. Bathing is carried out so that any particular portion of the tape is in the solution for approximately 1 minute. After washing in distilled water and air drying, the film is then coated by rolling over a "doctor" roller with a layer of thermoplastic polystyrene having a molecular weight approximately 25,000. The tape is then suitable for receiving and storing of information in accord with the thermoplastic recording technique.

*Example 19*

The evaporation process set forth in Example 11 is utilized to provide a 2500 A.U. thick evaporated layer of zinc sulfide on a Pyrex glass plate. The plate is then bathed in a saturated solution of technical grade copper sulphate in methyl alcohol at a temperature of 65° C. for 2 minutes. After bathing, the plate is washed in distilled water and air dried. The electrical resistance of the film after drying is found to be 150,000 ohms per square.

*Example 20*

The evaporation process of the Example 11 is utilized to form a 2500 A.U. thick layer of evaporated zinc sulfide on a Pyrex glass plate. The zinc sulfide layer is then bathed in a 5 normal solution of reagent copper sulphate and 5 normal reagent grade copper acetate in ethylene glycol at a temperature of 110° C. for 3 minuted. After bathing, the plate is washed in distilled water and air dried. The resistance of the film is found to be approximately of 15,000 ohms per square.

*Example 21*

The evaporation process of Example 11 is utilized to form a 2500 A.U. thick layer of evaporated zinc sulfide on a Pyrex glass plate. The Pyrex glass plate with the zinc sulfide layer thereon is bathed for 1 minute in a 3 normal solution of reagent grade copper sulphate in ethylene glycol at a temperature of 110° C. After bathing, the glass is washed in distilled water and air dried. The electrical resistance thereof is found to be 1000 ohms per square.

*Example 22*

The vapor deposition process described in Example 15 is practiced utilizing hydrogen sulfide gas, rather than hydrogen selenide gas to cause the formation of a chemically desposited layer of zinc sulfide approximately 1 micron thick upon the surface of the glass plate. The surface resistance of this film is greater than $10^{12}$ ohms per square. After washing and drying the layer upon the glass plate is submerged for 30 seconds in a solution of ¼ gram of reagent grade gold chloride in 100 millimeters of ethylene glycol while the solution is maintained at a temperature of 150° C. After submersion the plate is removed and, after drying, the resistance of the surface of the zinc sulfide layer is found to be approximately 10,000 ohms per square.

Example 23

The apparatus of FIG. 1 is utilized and the vapor reaction process of Example 1 is performed upon a 2" Pyrex glass plate. A pellet containing 10 grams of elemental zinc, 10 grams of elemental cadmium, 5 grams of zinc chloride and 5 grams of cadmium chloride is placed in the evaporation boat. After evacuation, hydrogen sulfide gas at a pressure of 350 microns is bled into the chamber, while a voltage of 25 volts is connected across the evaporation boat. The reaction is continued for 15 minutes while the glass plate is heated to a temperature of approximately 550° C. This process results in a formation of a layer of zinc-cadmium sulfide approximately 3 microns thick upon the surface of the glass plate. This layer has a surface resistance of the order of $10^{12}$ ohms per square. It is then immersed for 1 minute in a solution containing cuprous ions as described in Example 13, with the sole exception that the 10 gram of copper sulphate are replaced by 10 grams of copper acetate of the same grade. The solution is maintained at a temperature of 90° C. during treatment. After treating the glass plate is removed and, after drying, is found to exhibit a resistance of approximately 1800 ohms per square.

Example 24

The process of Example 23 is repeated utilizing, however, a pellet containing 10 grams of elemental zinc and 5 grams of zinc chloride and substituting for the hydrogen sulfide gas a volumetrically equivalent mixture of hydrogen sulfide and hydrogen selenide gases to form a 3 micron thick layer of zinc sulfo-selenide having a surface resistance of the order of $10^{12}$ ohms per square. After washing in distilled water and air drying the film formed, as described above, is immersed for 1 minute at a temperature of 90° C. in the solution described in Example 23. After drying, the resistance of the film is found to be approximately 550 ohms per square.

Example 25

A 3 micron thick layer of zinc-cadmium selenide is formed on a Pyrex disc by the process described in Example 23. In this example, however, a pellet containing 10 grams of elemental zinc, 10 grams of elemental cadmium, 5 grams of zinc chloride and 5 grams of cadmium chloride is placed in the evaporation boat. The gaseous atmosphere which is utilized is hydrogen selenide. After formation, the film is washed in distilled water and air dried and immersed in the solution described in Example 23 for 1 minute while the solution is maintained at a temperature of 90° C. After treatment, the film is dried and is found to exhibit a resistance of approximately 750 ohms per square.

Example 26

A 3 micron thick layer of cadmium sulfo-selenide is formed by the process described in Example 23 with the modification that a pellet containing 20 grams of elemental cadmium and 10 grams of cadmium chloride is utilized in the evaporation boat. The gaseous atmosphere utilized is a volumetrically equivalent mixture of hydrogen sulfide and hydrogen selenide. After the formation of the vapor deposited film, the film is washed in distilled water and air dried. It then exhibits a surface resistance of the order of $10^{12}$ ohms per square. The film is then immersed for 1 minute in the solution described in Example 23 while the solution is maintained at a temperature of approximately 90° C. After treatment the film is dried and the resistance is found to be approximately 230 ohms per square.

Example 27

The process of Example 9 is carried out with the sole exception that the copper acetate solution is replaced by a saturated solution of technical grade CuCl in water. The resultant film exhibits a resistance of approximately 100,000 ohms per square.

Example 28

The process of Example 9 is carried out with the sole exception that the copper acetate solution is replaced by a saturated solution of CuBr in ethylene glycol which is maintained at a temperature of 120° C. during bathing. The resultant product exhibits a surface resistance of approximately 10,000 ohms per square.

Example 29

The process of Example 9 is carried out with the sole exception that the copper acetate solution is replaced by a solution of 1 part by weight of $Cu(NO_3)_2$ to 5 parts ethylene glycol which is maintained at a temperature of 120° C. during bathing. The resultant product exhibits a surface resistance of 50,000 ohms per square.

Example 30

A layer of ZnS approximately 2500 A.U. thick is formed upon a 2" x 2" glass plate as in Example 11. The plate and layer are then washed for 2 minutes in an 85° C. solution containing 5 grams $Cu(CO_3)$, 100 grams pyridine, 100 grams of a 30% by weight water solution of $H_3PO_2$ and 50 grams of distilled water. After washing in distilled water and drying the surface resistance of the layer was found to be 1400 ohms per square.

Example 31

The process of Example 29 is carried out using a solution containing 2 grams copper acetyl-acetonate, 18 grams pyridine, 18 grams of a 30% by weight water solution of $H_3PO_2$ and 18 grams distilled water. After bathing for 2 minutes at 85° C., washing and drying, the layer was found to have a surface resistance of 1600 ohms per square.

While the invention has been set forth hereinbefore with respect to certain embodiments and certain specific examples thereof have been set forth by way of example, it is readily apparent to those skilled in the art that many modifications and changes may be made. Accordingly, we intend by the appended claims, to cover all such changes and modifications as fall within the true spirit and scope of the invention.

What we claim as new and desire to secure by Letters Patent of the United States is:

1. The method of forming a conductive film upon the surface of a crystalline layer of a high resistance compound having a cation selected from the group consisting of zinc, cadmium and mixtures thereof and an anion selected from the group consisting of sulphur, selenium, tellurium and mixtures thereof which method comprises immersing said layer in a solution containing metallic ions which are capable of replacing the cation of said compound and causing said solution to react with said compound by maintaining said layer in said solution at a temperature of approximately 25° C. to 150° C. for a time sufficient to allow a chemical reaction therebetween to form a surface-adjacent film of a substance having a low electrical resistance.

2. A method of forming a film having low electrical resistance upon a high-resistance substrate which method comprises: vapor depositing a crystalline layer of a high resistance compound having a cation selected from the group consisting of zinc, cadmium and mixtures thereof and an anion selected from the group consisting of sulphur, selenium, tellurium and mixtures thereof upon said substrate; immersing said layer in a solution containing metallic ions which are capable of replacing the cation of said high resistance compound and forming thereon a surface-adjacent film of a substance having a low electrical resistance by maintaining said layer in said solution at a temperature of approximately 25° C. to 150° C. for a time sufficient to cause a chemical reaction between said compound and said solution.

3. The method of forming a film having a low electrical resistance upon the surface of a substrate having a high electrical resistance which method comprises: vapor depositing upon said substrate a crystalline layer of a first compound having a cation selected from the group consisting of zinc, cadmium and mixtures thereof and an anion selected from the group consisting of sulphur, selenium, tellurium and mixtures thereof; immersing said layer in a polar solvent containing therein a second compound which dissociates in a presence of a polar solvent to yield metallic ions capable of replacing the cation of said first compound and forming thereon a surface-adjacent film of a substance having a low electrical resistance by maintaining said layer in said solution at a temperature of approximately 25° C. to 150° C. for a time sufficient to cause a chemical reaction between the surface of said layer and said metallic ions.

4. The method of claim 3 wherein said metallic ions are primarily monovalent ions and the first compound is zinc sulfide.

5. The method of forming a film having a low electrical resistance upon the surface of a substrate having a high electrical resistance which method comprises: vapor depositing upon said substrate a crystalline layer of a first compound having a cation selected from the group consisting of zinc, cadmium and mixtures thereof and an anion selected from the group consisting of sulphur, selenium, tellurium and mixtures thereof; immersing said layer in a polar solvent containing therein a second compound which dissociates in the presence of a polar solvent to yield metallic ions selected from the group consisting of copper, silver and gold which are able to replace cations of said first compound in the surface-adjacent region thereof and forming thereon a surface-adjacent film of a substance having a low electrical resistivity by maintaining said layer in said solution at a temperature of approximately 25° C. to 150° C. for a time sufficient to cause a chemical reaction between said metallic ions and the surface of said layer.

6. The method of claim 5 wherein said metallic ions are primarily monovalent.

7. The method of claim 5 wherein said metallic ions are copper ions and the first compound is zinc sulfide.

8. The method of forming a film having low electrical resistance upon the surface of a substrate having a high electrical resistance which method comprises: vapor depositing upon said substrate a transparent crystalline layer of a first compound having a cation selected from the group consisting of zinc, cadmium and mixtures thereof and an anion selected from the group consisting of sulphur, selenium, tellurium and mixtures thereof; immersing said layer in a polar solvent containing therein a second compound which dissociates in the presence of a polar solvent to yield metallic ions selected from the group consisting of copper, silver and gold which are able to replace the cations of said first compound and forming thereon a transparent surface-adjacent film of a compound having a low electrical resistance by maintaining said layer in said solution at a temperature of approximately 25° C. to 150° C. for a time sufficient to cause a chemical reaction between said metallic ions and the surface of said layer.

9. The method of claim 8 wherein said metallic ions are primarily monovalent ions.

10. The method of claim 9 wherein said metallic ions are primarily cuprous ions and the first compound is zinc sulfide.

11. The method of forming a film having a low electric resistance upon the surface of a substrate having high electrical resistance which method comprises: vapor depositing upon and substrate a crystalline layer of a first compound having cation selected from the group consisting of zinc, cadmium and mixtures thereof and an anion selected from the group consisting of sulphur, selenium, tellurium and mixtures thereof; immersing said layer in a polar solvent containing therein a second compound which dissociates in the presence of a polar solvent to yield metallic ions selected from the group consisting of copper, silver and gold which are adapted to replace the cation of said first compound and forming thereon a surface-adjacent film of a compound having a cation selected from the group consisting of copper, silver and gold and an ion selected from the group consisting of sulphur, selenium and tellurium by maintaining said layer in said solution at a temperature of approximately 25° C. to 150° C. for a time sufficient to cause a chemical reaction between said metallic ions and the surface of said layer.

12. The method of claim 11 wherein said metallic ions are primarily monovalent ions.

13. The method of claim 11 wherein said metallic ions are primarily cuprous ions and the first compound is zinc sulfide.

14. The method of forming a film having low electrical resistance upon the surface of a substrate having high electrical resistance which method comprises: vapor depositing upon said substrate a crystalline layer of a first compound having a cation selected from the group consisting of zinc, cadmium and mixtures thereof and an anion selected from the group consisting of sulphur, selenium, tellurium and mixtures thereof; immersing said layer in a polar solvent containing therein a second compound which dissociates in the presence of a polar solvent to yield cuprous ions capable of replacing the cation of said first compound and forming thereon a surface-adjacent film of a substance selected from the group consisting of cuprous sulfide, cuprous selenide, cuprous telluride and mixtures thereof by maintaining said layer in said solution at a temperature of approximately 25° C. to 150° C. for a time sufficient to cause a chemical reaction between said metallic ions and the surface of said layer.

15. The method of forming an electrically conductive film upon the surface of a flexible organic plastic tape prior to the deposition thereupon of a layer of thermoplastic material to form a composite tape suitable for the impression and storage of information thereupon by the establishment of an electric charge pattern thereupon which method comprises: vacuum evaporating upon a surface of said tape at a temperature below the temperature at which the substance of said tape is deformed a transparent crystalline layer of a first compound having a cation selected from the group consisting of zinc, cadmium and mixtures thereof and an anion selected from the group consisting of sulphur, selenium, tellurium and mixtures thereof; immersing said tape in a polar solvent containing therein in a second compound which dissociates in the presence of a polar solvent to yield metallic ions capable of replacing the cation of said first compound; and forming thereon a surface-adjacent film of a substance having a low electrical impedance by maintaining said layer in said solution at a temperature of approximately 25° C. to 150° C. for a time sufficient to cause a chemical reaction between said metallic ions and the surface of said layer.

16. The method of claim 15 in which said metallic ions are primarily monovalent ions.

17. The method of forming an electrically conductive transparent film upon the surface of a transparent insulating flexible plastic tape suitable for the base member of a thermoplastic recording tape which method comprises: vacuum evaporation upon one surface of said tape a transparent layer of a first compound having a cation selected from the group consisting of zinc, cadmium, and mixtures thereof and an anion selected from the group consisting of sulphur, selenium, tellurium and mixtures thereof and lowering the electrical resistance of the surface of said layer by immersion in a polar solvent containing therein a second compound which dissociates in the presence of a polar solvent to yield metallic ions selected from the group consisting of copper, silver and gold adapted to replace the cation of said first compound; and forming thereon a surface adjacent film of a compound having a low electrical resistance by maintaining said layer in said solution at a temperature of approximately 25° C. to 150° C. for a time sufficient to cause a chemical reaction between said metallic ions and the surface of said layer.

18. The method of claim 17 wherein said metallic ions are primarily monovalent ions and the first compound is zinc sulfide.

19. The method of forming an electrically conductive film upon the surface of a flexible transparent tape suitable for use as the base for a composite thermoplastic recording tape which method comprises: vacuum evaporating upon one surface of said tape a transparent layer of a first compound having a cation selected from the group consisting of zinc, cadmium and mixtures thereof and an anion selected from the group consisting of sulphur, selenium, tellurium and mixtures thereof; immersing said layer in a polar solvent containing therein a second compound which dissociates in the presence of a polar solvent to yield cuprous ions adapted to replace the cation of said first compound and forming a surface-adjacent conducting film of a compound selected from the group consisting of cuprous sulfide, cuprous selenide, cuprous telluride and mixtures thereof by maintaining said layer in said solution at a temperature of approximately 25° C. to 150° C. for a time sufficient to cause a chemical reaction between said cuprous ions and the surface of said layer.

20. An article of manufacture comprising: a composite flexible tape suitable for receiving and storing information and including a carrier layer of a light transmissive organic plastic substance; a second layer of a compound having a cation selected from the group consisting of zinc, cadmium and mixtures thereof and an anion selected from the group consisting of sulphur, selenium, tellurium and mixtures thereof upon said carrier layer; an electrically conducting film on said second layer; and a layer upon said electrically conducting film which is substantially solid at a first temperature and substantially liquid at a second, higher temperature, and being a compatible mixture of (1) an organopolysiloxane and (2) an aryl polymer selected from the class consisting of polyarylene ethers, a polystyrene and mixtures of a polyarylene ether and polystyrene, said electrically conducting film being a surface-adjacent region of said second layer in which the cation of said second compound has been replaced by another metallic ion selected from the group consisting of copper, silver and gold to produce an electrically conductive compound.

References Cited in the file of this patent

UNITED STATES PATENTS

| 2,704,265 | Lyon | Mar. 15, 1955 |
| 2,898,226 | Evans et al. | Aug. 4, 1959 |

FOREIGN PATENTS

| 788,659 | Great Britain | Jan. 8, 1958 |